United States Patent Office 3,499,020
Patented Mar. 3, 1970

3,499,020
REDUCTION OF SUBSTITUTED SILANES
Robert E. Robinson, Adrian, Mich., assignor to Stauffer Chemical Company, New York, N.Y., a corporation of Delaware
No Drawing. Filed Nov. 15, 1965, Ser. No. 507,688
Int. Cl. C07f 7/12; C01b 33/08
U.S. Cl. 260—448.2                  8 Claims

ABSTRACT OF THE DISCLOSURE

A method of reducing Si—Cl to Si—H in alkyl-halosilanes and tetrahalosilanes employing as a reducing agent a dialkylaluminum hydride in the presence of a complex of an ether and a dialkylaluminum halide.

---

This invention relates to the reduction of compounds of the type:

$$R_nSiX_{4-n}$$

where R is H, alkyl, cyclo-alkyl, alkenyl, aryl or alkaryl and X is halogen, —NR'$_2$ or an oxygen-bearing group as $$-OR', \quad -OSi\begin{matrix}R'\\|\\-R'\\|\\R'\end{matrix} \quad \text{and} \quad -O\overset{O}{\underset{\|}{C}}-R'$$

As to the groups comprising R', such designation, like R, denotes H, alkyl, cyclo-alkyl, alkenyl, aryl or alkaryl.

A reduction according to the invention is carried out using a reducing agent conforming to the formula:

$$\begin{matrix}R\\ \diagdown\\ \phantom{R}Al\text{--}H\\ \diagup\\ R\end{matrix}$$

wherein each R is an alkyl radical, preferably a lower alkyl radical, i.e., an alkyl radical containing not in excess of ten carbon atoms. Particularly good results are had if at least one of the alkyl radicals is a branched chain, e.g., isobutyl, isoamyl, etc.

The reducing agent most preferred for use in the practice of the invention is diisobutylaluminum hydride:

$$\begin{bmatrix}\phantom{H-}H\phantom{-H}\\|\\H-C-H\\H\phantom{-}|\phantom{-}H\\|\phantom{-C-}|\\H-C-C\\|\phantom{-}|\phantom{-}|\\H\phantom{-}H\phantom{-}H\end{bmatrix}_2 Al-H$$

This preference is based on the general effectiveness of the compound with respect to the reactions herein contemplated, its ready availability at reasonable cost, and its relative ease of handling.

Although pyrophoric in concentrated form, diisobutylaluminum hydride can be diluted to non-pyrophoric solutions without destroying its reducing effectiveness. Applicable solvents include hexane, heptane, toluene, benzene and tetrahydrofuran, for example. A 15–25 percent solution of the reducing agent is usually employed.

In addition to the solvents previously mentioned, diethyl ether and cyclohexane are applicable. In general, however, for reasons of cost and safety, toluene is most frequently employed. A 20 percent solution of diisobutylaluminum hydride in toluene is non-pyrophoric and can be pumped with little hazard under nitrogen from one vessel to another without contamination. Diisobutylaluminum is itself a liquid and is readily miscible with toluene.

As exemplary of other reducing agents within the scope of the invention may be mentioned: diethylaluminum hydride, dipropylaluminum hydride, diisoamyl aluminum hydride and the like. Using any of these or the diisobutyl compound in the reduction of trimethylchlorosilane, for instance, the reaction proceeds as follows:

$$(CH_3)_3SiCl + R_2AlH \rightarrow (CH_3)_3SiH + R_2AlX$$

The result indicated by the above equation is surprising because in attempting to so reduce a negatively substituted silane such as trimethylchlorosilane one would logically expect, statistically speaking, the formation of $(CH_3)_3SiR$ and $(CH_3)_3SiH$ in 2:1 ratio. Yet in accordance with the invention the conversion is entirely to the trimethylsilane.

An incidental but very important advantage of the illustrated reaction as carried out on a commercial scale, using diisobutyl aluminum hydride as the reducing agent, resides in the fact that the by-product diisobutyl aluminum chloride is much in demand as an olefin polymerization catalyst. It has been found that this particular reaction can be markedly speeded if effected in the presence of an ether solvent, as tetrahydrofuran for instance. The ether solvent can be used along or in admixture with a solvent of another type, e.g., benzene or toluene.

By way of explanation of the foregoing phenomenon, it may be stated that ethers such as tetrahydrofuran (THF) form stable complexes with organoaluminum compounds:

$$R_3Al + O\begin{matrix}\diagup CH_2-CH_2\\ \phantom{xx}|\\ \diagdown CH_2-CH_2\end{matrix} \longrightarrow R_3\overset{(-)}{Al}-\overset{(+)}{O}\begin{matrix}\diagup CH_2-CH_2\\ \phantom{xx}|\\ \diagdown CH_2-CH_2\end{matrix}$$

In such complexes, the ether acts as an electron donor or Lewis base and the $R_3Al$ as an electron acceptor or Lewis acid. As well understood the Cl in an Al—Cl bond carries a partial negative charge while the Al carries a partial positive charge. An Al—H bond is similarly polarized, but to a much lesser extent, since H is much less electronegative than Cl. Thus, it would seem that the Al in $R_2AlCl$ is more electron deficient than the Al in $R_2AlH$. $(i-C_4H_9)_2AlCl$ is then a stronger Lewis acid than is $(i-C_4H_9)_2AlH$ and in the reduction of $(CH_3)_3SiCl$ forms a stronger complex with THF. THF thus pulls the reaction to the right, since it prefers complexing with a strong acid rather than a weak one:

$$(CH_3)_3SiCl + \underset{\text{weak acid}}{(i-C_4H_9)_2AlH} \longrightarrow (CH_3)_3SiH + \underset{\text{strong acid}}{(i-C_4H_9)_2AlCl}$$

$$(i-C_4H_9)_2AlCl + O\begin{matrix}\diagup CH_2-CH_2\\ \phantom{xx}|\\ \diagdown CH_2-CH_2\end{matrix} \longrightarrow (i-C_4H_9)_2\overset{-}{Al}Cl\overset{+}{O}\begin{matrix}\diagup CH_2-CH_2\\ \phantom{xx}|\\ \diagdown CH_2-CH_2\end{matrix}$$

To illustrate the reduction of silanes comprising oxygen or nitrogen-bearing groups in accordance with the invention:

$$R_3Si-OR' + (alkyl)_2AlH \rightarrow R_3SiH + (alkyl)_2AlOR'$$

$$R_3Si-O\overset{O}{\underset{\|}{C}}-R' + (alkyl)_2AlH \longrightarrow R_3SiH + (alkyl)_2AlOCOR'$$

$$R_3Si-O-SiR'_3 + 2(alkyl)_2AlH \rightarrow$$
$$R_3R'_3(SiH)_2 + (alkyl)_2AlOAl(alkyl)_2$$
$$R_3SiN(R')_2 + (alkyl)_2AlH \rightarrow R_3SiH + (alkyl)_2AlN(R')_2$$

Most of the reactions herein are carried out at temperatures of the order of 25–100° C. Depending on the compound being reduced, this may require the application of heat or cooling. It is not meant to imply that the reaction may not be carried out at a higher or lower temperature if some advantage can be so attained.

The reaction times does not appear to be particularly critical, but in general the reaction should be allowed to continue for approximately one hour. In some cases the reaction is found to be quite rapid. Thus, a sample withdrawn from the reaction mixture within one-half minute after addition of the last increment of reducing agent may be found completely reduced as a sample withdrawn four hours later.

Nor does the order of addition of the reactants seem to matter in most instances, neither the yield nor the quality of the product being effected. Where the compound to be reduced is only slightly soluble in the applicable solvents the technique of Soxhlet may be followed (N. G. Gaylord, "Reduction With Complex Metal Hydrides," 1st ed., p. 1009, Interscience, New York, 1956).

In determining the mol ratio of the reducing agent one takes into account, of course, the number of groups to be reduced. Usually, a slight excess of reducing agent is advisable.

Following expiration of the reaction period, the reacted mixture is processed as required to recover the reduced material. In some cases, simple distillation suffices. In other instances, it may be necessary to first hydrolyze the mixture to effect disruption of aluminum complex and to destroy excess reducing agent. Also, depending on the nature of the products of the hydrolysis, it may or may not be necessary to filter the mixture before it is finally treated for recovery of the product.

As hereinbefore indicated a compound treated according to the invention may comprise one or a plurality of reducible groups. It is frequently possible to adjust the reaction conditions so that less than all of the reducible groups are reduced, where this is desired. The presence of more than one group to be reduced, as previously suggested, demands the employment of a greater amount of the reducing agent, as set by theory.

As typical of compounds other than trimethylchlorosilane which may be reduced by the method herein may be mentioned: tricyclohexylfluorosilane, dimethyldichlorosilane, methyltrichlorosilane, vinyltrichlorosilane, diphenyldichlorosilane, trimethylethoxysilane, hexamethyldisiloxane, tetraethoxysilane, N-ethylaminotrimethylsilane, N,N-diethylaminotrimethylsilane, trimethylsilyl acetate, trimethylsilanol, and silicon tetrachloride.

Care should be exercised in the reduction of compounds containing unsaturated linkages to maintain the temperature substantially below 100° C. in order to prevent the occurrence of addition reactions.

The invention is further illustrated by the accompanying examples which are not to be taken as in any way limitative thereof:

EXAMPLE I

A 500 ml. 3-necked flask was equipped with a paddle type stirrer, a dropping funnel, a nitrogen inlet and a thermometer. A solution of 11.9 gm. (0.11 mole) of trimethylchlorosilane in 50 ml. of toluene was introduced into the flask. Thereafter a solution of 15.6 gm. (0.11 mole) of diisobutyl-aluminum hydride and 7.7 gm. of tetrahydrofuran in 60 gm. of toluene was added with stirring over 10 minutes, via the dropping funnel, the temperature being held at 23–31° C. by external cooling. Following fifteen minutes reaction, analysis of an aliquot by vapor phase chromatography showed the yield of trimethylsilane as 97%. The product silane was isolated by heating to 110° and collecting it in a trap cooled with Dry Ice and methanol.

EXAMPLE II

A flask equipped as the flask of Example I was charged with 8.5 gm. (0.06 mole) of diisobutylaluminum hydride in 40 ml. of benzene. To this was added over one hour at 20° C. 14.8 gm. (0.05 mole) of tricyclohexylfluorosilane. After standing overnight the mixture was heated under reflux three hours. The solution was then hydrolyzed by the addition of 13 ml. of water at 20–25° C. over twenty minutes, then filtered free of inorganic material. The filtrate was concentrated and distilled under reduced pressure to yield 12.4 gm. (89%) of tricyclohexylsilane, B.P. 125–140° C. (0.15 mm.), $n_D^{20}$ 1.5148.

EXAMPLE III

Following the procedure of Example I, 8.6 gm. (0.053 mole) of hexamethyldisiloxane in 50 ml. of toluene was treated over two minutes at 28° C. with 15.6 gm. (0.11 mole) of diisobutylaluminum hydride mixed with 70 ml. of toluene. After standing overnight, the mixture was heated one hour at 68° C. Analysis by vapor phase chromatography indicated that the hexamethyldisiloxane was 93% converted to trimethylsilane (0.099 mole).

EXAMPLE IV

Following the procedure of Example I, 17.4 gm. (0.12 mole) of diethylaminotrimethylsilane, $(CH_3)_3SiN(C_2H_5)_2$, in 50 ml. of benzene was treated over ten minutes at 25–28° C. with 16.8 gm. (0.12 mole) of diisobutylaluminum hydride in 75 ml. of benzene. The yield of trimethylsilane according to vapor phase chromatographic analysis was about 20%.

EXAMPLE V

Following the procedure of Example I, 14.2 gm. (0.11 mole) of dimethyldichlorosilane in 50 ml. of toluene was treated for five minutes at 20–27° C. with a solution consisting of 31.3 gm. (0.22 mole) of diisobutylaluminum hydride and 15.3 gm. of tetrahydrofuran in 140 ml. of toluene. After a thirty-five minute stirring period, the yield of dimethylsilane was shown by vapor phase chromatographic analysis to be 95%. Isolation of the silane product was achieved by heating the mixture to reflux and collecting it in a trap cooled by Dry Ice and methanol. The dimethylsilane boiled at −20° C.

EXAMPLE VI

Under the conditions of Example I, 0.1 mole of diphenyldichlorosilane in 50 ml. of benzene was treated over twenty minutes with 0.1 mole of diisobutylaluminum hydride in 100 ml. of benzene. 10 ml. of tetrahydrofuran was then added to the reaction mixture. After thirty minutes, analysis by vapor phase chromatography indicated the following.

| Unreacted: | Moles |
|---|---|
| $\phi_2SiCl_2$ | 0.052 |
| $\phi_2SiHCl$ | 0.006 |
| $\phi_2SiH_2$ | 0.042 |

EXAMPLE VII

Under the conditions of Example I, 0.025 mole of tetraethoxysilane in 50 ml. of benzene was treated with 0.10 mole of diisobutylaluminum hydride in 100 ml. of benzene. A very vigorous reaction took place generating a very pyrophoric gas which did not condense at −78° C. This apparently was $SiH_4$.

EXAMPLE VIII

Under the conditions of Example I, 0.033 mole of vinyltrichlorosilane in 50 ml. of toluene was treated over forty-five minutes with 0.10 mole of diisobutylaluminum hydride at 25–35° C. After the mixture was stirred an additional two hours, it was found to contain 0.031 mole (94%) of vinylsilane (gas chromatographic analysis).

The invention claimed is:

1. In the reduction of a compound conforming to the formula:

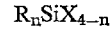

in which R is H, alkyl, cyclo-alkyl, alkenyl, aryl or alkaryl, X is halogen and $n$ is 0, 1, 2, or 3, the improvement which comprises treating such compound in the presence of an ether with a dialkylaluminum hydride in which each alkyl radical contains not in excess of ten carbon atoms, such treatment proceeding with formation of a complex of the ether and a dialkylaluminum halide in which the alkyl groups correspond to those contained in the dialkylaluminum hydride and in which the halogen atom is derived from the compound subjected to the treatment.

2. Process according to claim 1 as practiced using diisobutyl aluminum hydride as the reducing agent.

3. Process conforming to claim 2 as practiced to reduce trimethylchlorosilane to trimethylsilane.

4. Process conforming to claim 3 as carried out in the presence of tetrahydrofuran.

5. Process conforming to claim 2 as practiced to reduce tricyclohexylfluorosilane to tricyclohexylsilane.

6. Process according to claim 2 as practiced to reduce dimethyldichlorosilane to dimethylsilane.

7. Process according to claim 2 as practiced to reduce diphenyldichlorosilane to diphenylsilane.

8. Process according to claim 2 as practiced to reduce vinyltrichlorosilane to vinylsilane.

References Cited
UNITED STATES PATENTS

| | | |
|---|---|---|
| 2,458,703 | 1/1949 | Hatcher 260—448.2 X |
| 2,897,220 | 7/1959 | Jenkner 260—448.2 X |
| 3,099,671 | 7/1963 | George. |
| 3,099,672 | 7/1963 | Cooper et al. |
| 3,337,597 | 8/1967 | Berger. |
| 3,362,976 | 1/1968 | Berger. |
| 3,143,542 | 8/1964 | Ziegler et al. |

DANIEL E. WYMAN, Primary Examiner

P. F. SHAVER, Assistant Examiner

U.S. Cl. X.R.

23—366; 260—448, 448.8

UNITED STATES PATENT OFFICE
CERTIFICATE OF CORRECTION

Patent No. 3,499,020                                        March 3, 1970

Robert E. Robinson

It is certified that error appears in the above identified patent and that said Letters Patent are hereby corrected as shown below:

Column 2, line 22, "along" should read -- alone --. Column 3, line 3, after "found" insert -- as --. Column 4, line 13, $(CH_3)_3SiI(C_2H_5)_2$      should read      $(CH_3)_3SiN(C_2H_5)_2$ Signed and sealed this 30th day of March 1971.

(SEAL)
Attest:

EDWARD M. FLETCHER, JR.
Attesting Officer

WILLIAM E. SCHUYLER, JR.
Commissioner of Patents